United States Patent [19]

Schwarz et al.

[11] Patent Number: 5,017,436

[45] Date of Patent: May 21, 1991

[54] CLEAR THERMOPLASTIC POLYMER COMPOSITE MATERIAL

[76] Inventors: Dick Schwarz, 807 Whitecap Dr., Seabrook, Tex. 77586; Bob Warrer, 1816 Lazy Creek La., Pearland, Tex. 77581; Mike Musgrave, 4510 Briar Hollow Pl., #310, Houston, Tex. 77027; Bob Cruson, Rte. 1, Box 325, Roanoke, Tex. 76262; Christa Gordon, 2624 Rogers St., Fort Worth, Tex. 76109; Todd Weinert, 23506 Elmwood Ct., Spring, Tex. 77389

[21] Appl. No.: 278,383

[22] Filed: Dec. 1, 1988

[51] Int. Cl.⁵ .................. B32B 25/08; B32B 25/14; B32B 27/06; B32B 27/30

[52] U.S. Cl. .................................... 428/519; 428/517
[58] Field of Search .................... 428/517, 519

[56] References Cited

U.S. PATENT DOCUMENTS

| | | | |
|---|---|---|---|
| 4,440,824 | 4/1984 | Bonis | 425/517 |
| 4,585,679 | 4/1986 | Karabedian | 428/517 |
| 4,808,482 | 2/1989 | Benge et al. | 428/517 |

Primary Examiner—Allan M. Lieberman

[57] ABSTRACT

Disclosed is a material and a process for mkaing that material as well as containers made from the material, which material comprises a clear multilayer sheet of an olefinic polymer or copolymer, and SEBS rubber tie-layer, and a monovinyl aromatic polymer.

7 Claims, No Drawings

CLEAR THERMOPLASTIC POLYMER COMPOSITE MATERIAL

FIELD OF THE INVENTION

The present invention relates to a material, and a process for manufacturing that material, comprising a polyolefin/rubber/styrene polymer composite. More particularly, the invention relates to a clear coextruded sheet material, and a process for manufacturing it, which material comprises a layer of an olefin polymer such as polypropylene, a tie layer made from a rubber such as SEBS rubber, and a layer of a styrenic polymer such as polystyrene.

BACKGROUND OF THE INVENTION

It is well known in the field of thermoforming plastics and more particularly in container manufacture to utilize a composite or "sandwich" sheet of thermoplastic material manufactured through the process of coextrusion whereby a first polymeric material is coextruded onto a second polymeric material and adhered thereto by means of a "tie" layer of a third coextruded polymeric material. For example, it has been known to utilize layers of polyethylene terephthalate (PET) and ethylene vinyl alcohol (EVAL) t manufacture containers having high barrier characteristics and being impervious to chemical attack. Such composite materials are coextruded through sheet coextruders wherein the final sheet may have a layer of PET sandwiched on each side of a layer of EVAL. Other known coextruded composite sheets include combinations of the known thermoplastic polymers such as polystyrene, polyethylene, and polypropylene, and their various related homologues.

Other technologies attempt to obtain the beneficial properties of various polymer materials by "blending" the materials into an "alloy" which hopefully retains the beneficial qualities of each particular polymer while overcoming the deficiencies of those polymers. One example of such a blend is that disclosed in U.S. Pat. Nos. 4,386,187 and 4,386,188 which teach a blend of polyolefin such as polyethylene or polypropylene as the major component with a styrene polymer as a secondary component and a "suitable compatibilizer". The compatibilizer utilized comprises mainly the SBS (styrene-butadiene-styrene) rubbers and the styrene-isoprene and styrene-ethylene rubbers. The blends consist of a compounded mixture of the olefin material, the styrene polymer, and the SBS rubber, which result in an "alloy" having a translucent or pearlescent color and hopefully retaining the beneficial properties of the blend components.

Another blended alloy is that disclosed in U.S. Pat. No. 3,810,957, consisting of a monovinyl aromatic compound such as polystyrene, blended with a block copolymer of a monovinyl arene and a selectively hydrogenated diene.

Still another alloy is that disclosed in U.S. Pat. No. 4,031,166 consisting of polystyrene and a "soft component" which consists of a mixture of a polyolefin and a copolymer of a vinyl aromatic and a diene hydrocarbon.

The difficulties incurred with these types of blends is that the compatibilizer (SBS rubber) which is utilized therein, does not offer sufficient compatibility to substantially eliminate the phenomenon of delamination which occurs between the various component particles in the blend. The SBS compatibilizer allows the olefinic material to delaminate from the styrenic polymer material and produces powdering and flaking of the final blended thermoformed product. Also, the known processes and blends require a usage of a very large proportion of the olefinic material compared to the styrenic polymer which adds to the cost of the final product.

SUMMARY OF THE INVENTION

The present invention overcomes the deficiencies and difficulties of the known processes by providing a composite material utilizing a compatibilizer that provides more complete bonding of an olefinic polymer to a styrenic polymer and retains the beneficial advantages of both the olefinic material and the styrenic material. This is achieved by the use of a coextruded multi-layered sheet wherein the compatibilizer is utilized as a tie layer between a layer of the olefinic polymer and a layer of the styrenic polymer. The tie layer utilized is an SEBS (styrene-ethylene-butylene-styrene) rubber which provides much greater compatibilization than the known blended materials using SBS rubber.

The present invention also discloses a composite material which may be obtained from the coextrusion recycle by grinding the scrap therefrom and forming a blend by melting and compounding the ground scrap. The resulting blend is an alloy of the olefinic polymer, the SEBS rubber and the styrenic polymer. Conversely, the coextruded material may be blended, pelletized and sold as a virgin blend prior to thermoforming instead of as a recycled blend. The particular compatibilizer utilized, SEBS polymer, allows the production of a superior blended alloy having less delamination and better overall properties than the above-described known alloys.

DETAILED DESCRIPTION OF THE INVENTION

The present invention comprises a multilayered polymeric material formed by means such as lamination or coextrusion and having at least three layers consisting of an olefin layer, a styrene-ethylene-butylene-styrene (SEBS) rubber layer and a styrenic polymer layer. A more preferred embodiment of the invention utilizes a polypropylene layer, an SEBS rubber layer, and a polystyrene layer. An even more preferred embodiment of the invention comprises: (a) an ethylene-polypropylene random copolymer material as the olefin layer, having about 2-7% by weight ethylene in the copolymer, (b) an SEBS rubber tie-layer, and (c) a general purpose polystyrene layer.

In one specific example of preferred embodiment of the present invention a composite coextruded sheet of material was formed by coextruding through a 3-extruder die head a top layer of the random copolymer polypropylene, a tie layer of styrene-ethylene-butylene-styrene (SEBS) block copolymer rubber, and a bottom layer of polystyrene. The copolymer polypropylene comprised 12% of the sheet by weight and consisted of Fina Oil and Chemical Company's 7622 uMZ copolymer polypropylene having about 3% ethylene content by weight. The tie layer consisted of an SEBS rubber manufactured by Shell Chemical Company and designated as Shell Kraton ® G1657, which is an hydrogenated SEBS block copolymer comprising 14% styrene and 86% ethylene-butylene rubber, by weight. The tie layer comprised 4% by weight of the final coextruded sheet.

The bottom extrusion layer consisted of Fina's 535 General Purpose Polystyrene which comprised the remaining 84% by weight of the coextruded sheet.

The sheet material was formed by running a three-extruder coextrusion system into a three-layer sheet coextrusion die head, all of which are commercially available through the Welex Corporation of King of Prussia, Pa. The coextruded sheet was cooled on a set of chill rolls, rolled into stock and transferred to a thermoformer where it was thermoformed on standard heat-forming equipment, such as a Brown Vacuum/plug assist/air blow forming machine, into cup-shaped containers.

By using thin layers of polypropylene and SEBS and a relatively thick layer of polystyrene, thermoformability of the sheet was found to be exceptionally good due to the excellent formability of the polystyrene.

Also the integral sheet of copolymer polypropylene provides exceptional moisture barrier characteristics, excellent organoleptics, and high ESCR (Environmental Stress Crack Resistance). The presence of the SEBS tie-layer and the ethylene-propylene copolymer also provided flexibility and toughness to the relatively rigid and somewhat brittle polystyrene component. By utilizing the Fina u-grade polypropylene copolymer and the Fina general purpose polystyrene, a clear container was obtained which is very desirable from an esthetic viewpoint. Also, by having the polystyrene surface on the outside, the container presents an external surface that is easily printed on and can accept detailed multi-colored printed labels.

In another aspect of the present invention, it should be noted that the ratio of olefin polymer to styrenic polymer is important because of the differing shrinkage rates of these two materials, the olefins having a higher shrinkage than the styrenic polymers. It is important to maintain a relatively large proportion of one of the polymers to the other polymer in order to minimize the warping that occurs when relatively equal amounts of materials of differing shrinkage are bonded together.

In the present embodiment, a much larger proportion of the styrenic polymer was used compared to the olefinic and in fact their ratio was 7:1. It would be possible to reverse the proportions and make the olefinic polymer the major component and the styrenic polymer the minor one. The results of such a reversed ratio should also be acceptable.

In the preferred embodiment the styrenic polymer was made the major component for several reasons: (a) general purpose polystyrene is generally a less expensive material and is more dense, (b) the styrenic polymer was used to impart rigidity and thermoformability to the composite and this depended as much on its bulk a its chemical properties, and (c) the polypropylene was used for its moisture barrier, ESCR, and organoleptic properties which were less dependent upon the amount of polypropylene utilized and more dependent upon its properties.

The desirable proportions of the various components used are from 10 to 40 percent polypropylene copolymers, from 3 to 10 percent SEBS rubber, and from 50 to 87 percent styrenic polymer (by weight). Preferably the olefin component would be in the range of 10 to 20 percent, the SEBS from 3 to 5 percent, and the styrenic polymer from 75 to 87 percent (by weight).

If different properties of the finished product (such as rigidity, toughness, flexibility, etc.) are desired, the ratios of olefins to styrenic polymers given above could be reversed. Whereas the given ratios above are preferable for rigid containers, such as food cups or "tubs", a reversed ratio with the olefin as the major component would provide a different type of package such as the well-known "blister-pak".

One additional advantage of the multiple-layer polymer sheet is in the denesting of thermoformed containers. Polypropylene with glycerol monostearate added is an anti-static polymer compared to polystyrene and thus contributes to easier denesting of container components by elimination or reduction of static attraction between the nested containers. Also, denesting can be aided by adding anti-blocking additives such as dibenzylsorbitol to polypropylene.

Another advantage to the present invention is in the area of heat-sealing of containers. The presence of ethylene in the polypropylene copolymer tends to lower the melt temperature of the copolymer. By rolling the rim of the thermoformed container outward to expose the copolymer surface to the heatsealing apparatus a lower sealing temperature can be utilized when compared to a polypropylene homopolymer, thereby reducing the energy costs of the packaging and simultaneously reducing thermal degradation of the package and its contents, and increasing line speeds in the packaging operation.

It should be noted that references to "styrenic polymers" are intended to include those monovinyl aromatic compounds commonly known to those skilled in the art, including such styrenic compounds as alphamethyl and alpha-ethyl styrene, ring-substituted alkyl styrenes, and ring-substituted halostyrenes. The phrase "olefin" or "olefinic polymer" is intended to include polypropylene, polyethylene, and ethylene-propylene copolymers.

Thus, the present invention provides a multilayered polymer material offering the full advantages of each type of polymer used in the material.

What is claimed:

1. A multilayered polymeric sheet material comprising:
    a first layer of material comprising an olefinic polymer;
    a second layer of material comprising a styrene-ethylene-butadiene-styrene block copolymer rubber integrally bonded to said first layer;
    a third layer of material comprising a monovinyl aromatic polymer integrally bonded to said second layer;
    wherein said olefinic polymer is chosen from the group consisting of polypropylene, polyethylene and ethylene-propylene copolymers;
    wherein said monovinyl aromatic polymer is chosen from the group consisting of polystyrene, polymers of alpha-methyl styrene, polymers of alpha-ethyl styrene, polymers of ring-substituted alkyl styrenes and polymers of ring-substituted halostyrenes; and
    wherein said olefinic polymer layer comprises from about ten to forty percent by weight of the sheet material, said rubber layer comprises from about three to about ten percent by weight of the sheet material, and said monovinyl aromatic polymer layer comprises from about fifty to about eighty-seven percent of the sheet material.

2. The sheet material of claim 1 wherein said olefinic polymer is an ethylene-propylene copolymer, and said monovinyl aromatic polymer is polystyrene.

3. The sheet material of claim 2 wherein said copolymer layer comprises an ethylene-propylene random copolymer having about three percent by weight ethylene and the remainder substantially propylene.

4. The sheet material of claim 3 wherein said copolymer layer comprises about twelve percent by weight of said sheet, said rubber layer comprises about four percent by weight of said sheet, and said polystyrene layer comprises about eighty-four percent by weight of said sheet.

5. The sheet material of claim 4 wherein said sheet is formed by coextrusion.

6. A multilayered polymeric sheet material of claim 1 wherein the proportion of said layers is about 7:1 by weight of polystyrene to polypropylene.

7. The sheet material of claim 1 wherein said olefinic polymer layer comprises from about ten to about twenty percent by weight of the sheet material, said rubber layer comprises from about three to about five percent by weight of the sheet material, and said monovinyl aromatic polymer layer comprises from about seventy-five to about eighty-seven percent by weight of the sheet material.

* * * * *

UNITED STATES PATENT AND TRADEMARK OFFICE
CERTIFICATE OF CORRECTION

PATENT NO. : 5,017,436

DATED : May 21, 1991

INVENTOR(S) : Schwarz et al

It is certified that error appears in the above-identified patent and that said Letters Patent is hereby corrected as shown below:

On the title page, after item [76] Inventors: insert the following:
--[73] Assignee:  Fina Technology, Inc., Dallas, Texas --

Signed and Sealed this

Ninth Day of November, 1993

Attest:

BRUCE LEHMAN

*Attesting Officer*   *Commissioner of Patents and Trademarks*